(12) United States Patent
Nakamura et al.

(10) Patent No.: US 11,077,884 B2
(45) Date of Patent: Aug. 3, 2021

(54) UTILITY VEHICLE

(71) Applicant: KAWASAKI JUKOGYO KABUSHIKI KAISHA, Kobe (JP)

(72) Inventors: Kenta Nakamura, Kakogawa (JP); Yasuhisa Okabe, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 71 days.

(21) Appl. No.: 16/429,607

(22) Filed: Jun. 3, 2019

(65) Prior Publication Data
US 2020/0377157 A1 Dec. 3, 2020

(51) Int. Cl.
B62D 25/20 (2006.01)
B62D 21/18 (2006.01)
B62D 21/15 (2006.01)

(52) U.S. Cl.
CPC ....... B62D 25/2072 (2013.01); B62D 21/155 (2013.01); B62D 21/18 (2013.01); *B60Y 2200/20* (2013.01)

(58) Field of Classification Search
CPC .... B62D 25/2072; B62D 21/15; B62D 25/00; B62D 25/20; B61D 21/155; F16N 31/006; B60R 13/0861; B60R 19/026; B60R 19/24; B60R 2019/926

USPC ............................ 280/770, 757; 296/204, 41
See application file for complete search history.

(56) References Cited

U.S. PATENT DOCUMENTS

| 3,754,615 | A | * | 8/1973 | McIndoo | ............... | E02F 9/0841 180/69.1 |
| 3,826,327 | A | * | 7/1974 | Stover | ................ | B62D 55/0845 180/69.1 |
| 4,655,307 | A | * | 4/1987 | Lamoureux | ........ | B62D 25/2072 180/69.1 |
| 7,055,895 | B1 | * | 6/2006 | King | .................. | B62D 25/2072 280/770 |
| 8,028,781 | B2 | * | 10/2011 | Fausch | .................... | A01D 75/18 180/69.1 |
| 10,836,442 | B1 | * | 11/2020 | Grattan | ................. | B60R 13/005 |
| 2014/0103627 | A1 | | 4/2014 | Deckard et al. | | |
| 2017/0349217 | A1 | * | 12/2017 | Otsuka | ................. | B62D 21/157 |
| 2018/0215328 | A1 | * | 8/2018 | Sweder | ................ | B62D 35/005 |

FOREIGN PATENT DOCUMENTS

DE 102014114263 A1 * 4/2016 ......... B60R 13/0861

* cited by examiner

Primary Examiner — Paul N Dickson
Assistant Examiner — Matthew D Lee
(74) Attorney, Agent, or Firm — Wenderoth, Lind & Ponack, L.L.P.

(57) ABSTRACT

A utility vehicle includes a main frame, and a bottom plate disposed below the main frame and attached to the main frame. A slide member is attached to a lower surface of the bottom plate.

12 Claims, 8 Drawing Sheets

UTILITY VEHICLE

BACKGROUND OF THE INVENTION

1. Field of the Invention

The present invention relates to a utility vehicle.

2. Description of the Related Art

Conventionally, a utility vehicle having enhanced traveling performance on an uneven ground has been known. For example, as shown in US 2014/0103627 A, such a utility vehicle is configured to have a high ground height at the bottom of the vehicle body, which prevents an obstacle on the road surface from coming into contact with or being caught by the bottom of the vehicle.

SUMMARY OF THE INVENTION

Here, when a vehicle runs over an obstacle (for example, a large rock) on a road surface when traveling an uneven road, although the front wheels and the rear wheels configured to be swingable in an up and down direction can run over the obstacle, the bottom of the vehicle body may come into contact with or being caught by the obstacle, or run on the obstacle and get stuck. In particular, a contact between the bottom of the vehicle body and the obstacle is likely to occur between the front wheel and the rear wheel.

Therefore, it is an object of the present invention to provide a utility vehicle having a further enhanced traveling performance on an uneven ground.

In order to achieve the object, the present invention is a utility vehicle including a main frame and a bottom plate disposed below the main frame and attached to the main frame. A slide member is attached to a lower surface of the bottom plate.

According to the configuration described above, even when an obstacle comes into contact with the bottom plate, the utility vehicle can easily run over the obstacle by the slide member. Therefore, the traveling performance on an uneven ground can be further enhanced.

It is preferable that the present invention further has the following configurations.

(1) The main frame includes a pair of left and right center frames that extends obliquely outward in the vehicle width direction from the vicinity of the front end of the seat of the utility vehicle to the vicinity of the rear end of the seat. The slide member includes a pair of left and right main members provided along the center frames.

(2) In the configuration of (1), the slide member includes an intermediate member that is positioned in the middle in the vehicle width direction of the pair of left and right main members, and extends rearward in parallel with the front-rear direction of the vehicle body.

(3) In the configuration of (2), in the front-rear direction of the vehicle body, the front end position of each of the main members coincides with the front end position of the intermediate member, and the rear end position of each of the main members coincides with the rear end position of the intermediate member, and the widthwise length of each of the main members and the widthwise length of the intermediate member coincide with each other.

(4) The slide member includes outer members that are positioned outside in the vehicle width direction of the pair of left and right main members, and extends rearward in parallel with the front-rear direction of the vehicle body.

(5) In the slide member, the outer ends in the vehicle width direction of the bottom surface are chamfered, and the outer surfaces in the vehicle width direction are inclined inward in the vehicle width direction from the upper end to the lower end.

According to the configuration of (1), since the main members of the slide member are provided along the center frames, the slide members can be firmly supported. In addition, since the main members extend rearward and obliquely outward in the vehicle width direction along the center frames, even when an obstacle comes in contact with the main member, the obstacle can be easily released outward in the vehicle width direction according to the traveling of the utility vehicle. Therefore, it is possible to suppress catching of the obstacle.

According to the configuration of (2), by providing the intermediate member of the slide member, it is possible to suppress catching of an obstacle in a center portion in the vehicle width direction.

According to the configuration of (3), by making the lengths in the front-rear direction of the vehicle body and the widthwise lengths of the main members and the intermediate member coincide with each other, it is possible to suppress catching of an obstacle between one of the main members and the intermediate member.

According to the configuration of (4), by providing the outer members of the slide member, it is possible to suppress catching of an obstacle in the vicinity of the end portion in the vehicle width direction.

According to the configuration of (5), the outer ends of the bottom surface of the slide member in the vehicle width direction are chamfered, and the outer surfaces in the vehicle width direction are inclined inward in the vehicle width direction from the upper end toward the lower end. Therefore, even when an obstacle comes into contact with the slide member, it is possible to suppress catching of the obstacle.

In summary, according to the present invention, it is possible to provide a utility vehicle having further enhanced traveling performance on an uneven ground.

DETAILED DESCRIPTION OF THE PREFERRED EMBODIMENTS

Hereinafter, a utility vehicle according to an embodiment of the present invention will be described with reference to the accompanying drawings. A utility vehicle is a vehicle that mainly travels not only grasslands, gravels, and sandy areas, but also off-road such as unpaved mountain roads and forest roads, and muds and rocky areas. For the sake of explanation, a traveling direction of a utility vehicle is assumed to be the "front" of the utility vehicle and the respective components, and left and right in a vehicle width direction when an occupant on the utility vehicle looks ahead are assumed to be "left and right".

[Overall Structure of Vehicle]

Figure 1:
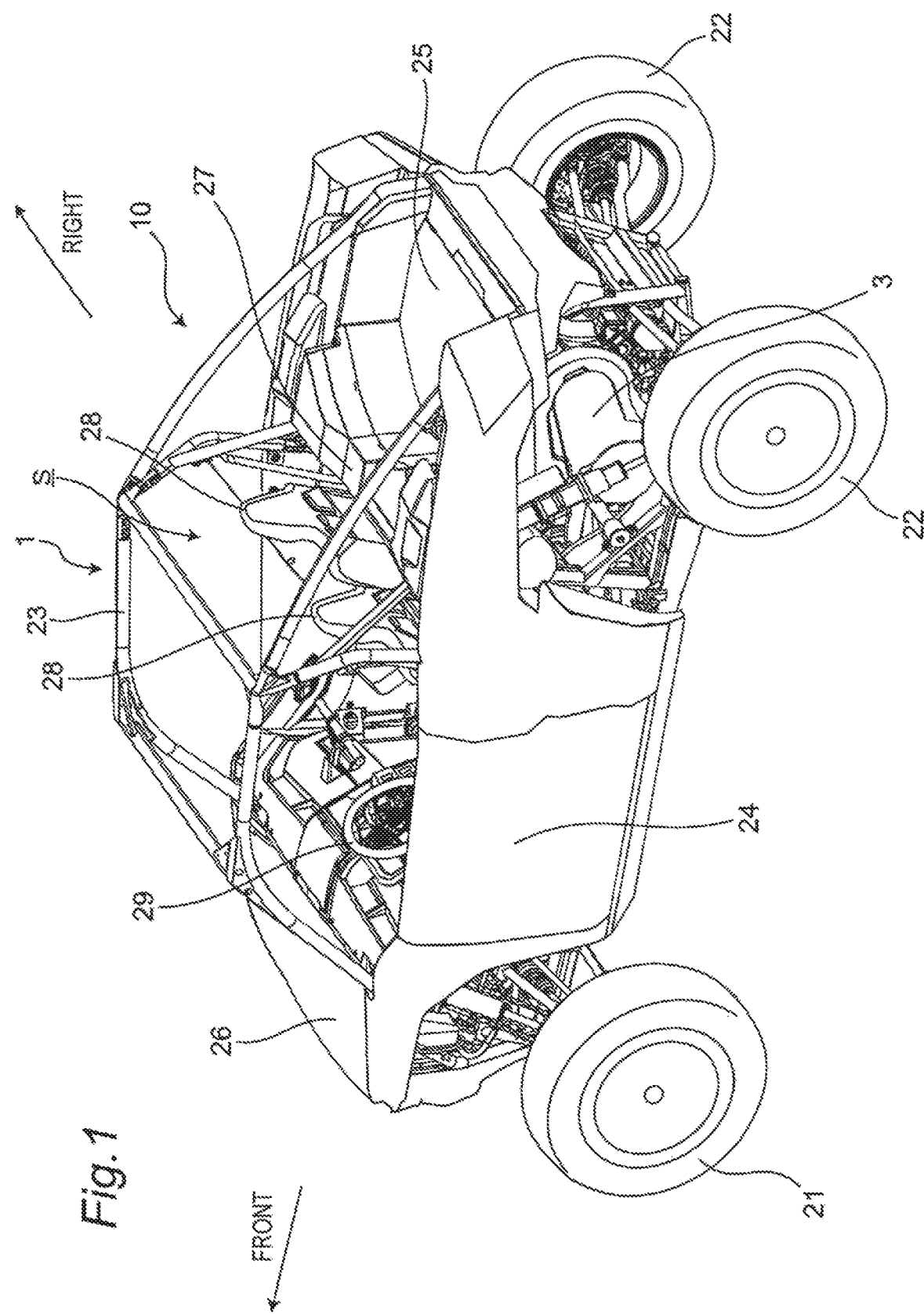
FIG. 1 is a perspective view of a utility vehicle according to an embodiment of the present invention.
Figure 2:
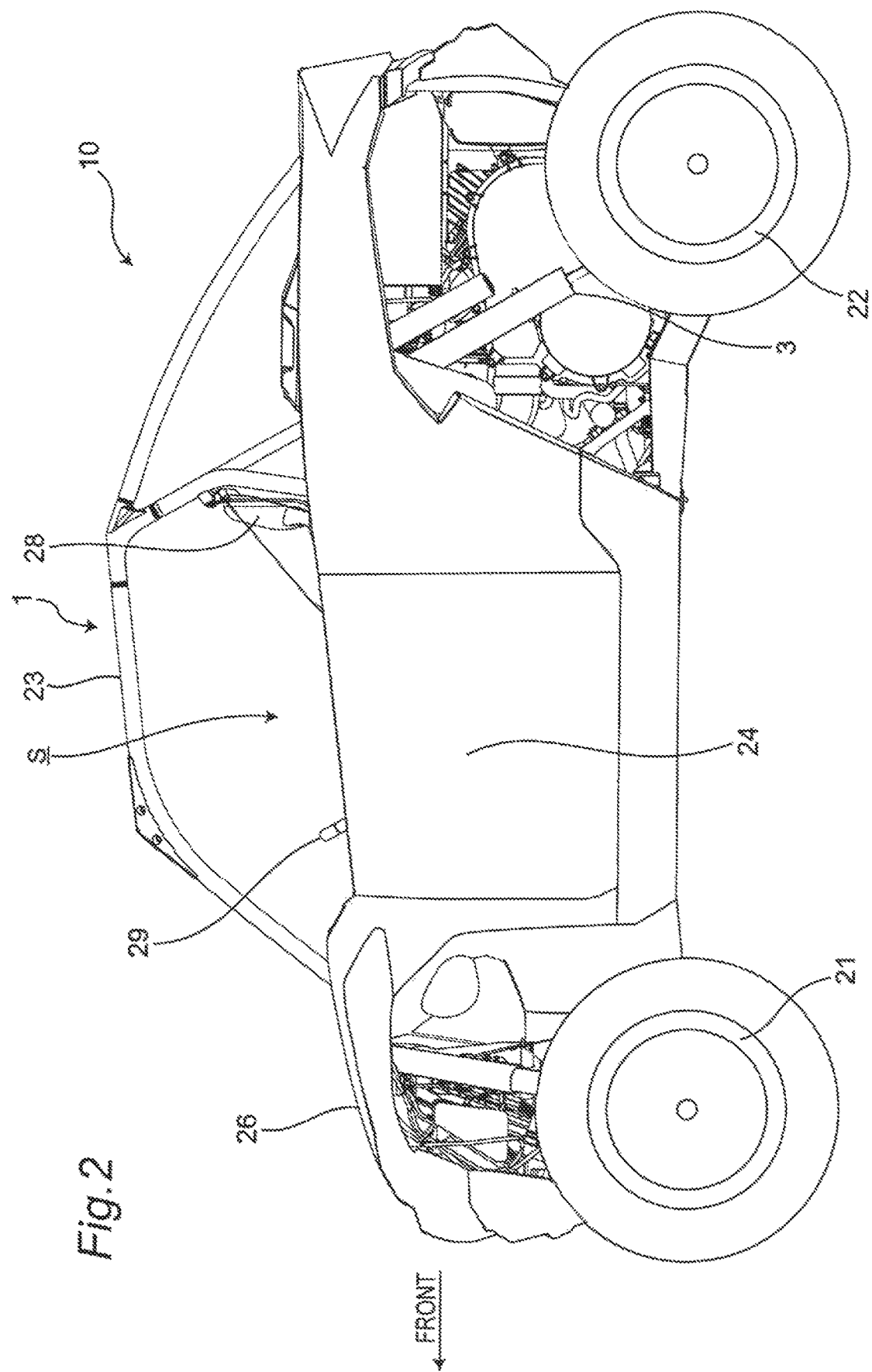
FIG. 2 is a left side view of the utility vehicle of FIG. 1.

FIG. 1 is a perspective view of a utility vehicle according to an embodiment of the present invention, and FIG. 2 is a left side view of the utility vehicle of FIG. 1.

As shown in FIGS. 1 and 2, the utility vehicle 10 has a pair of left and right front wheels 21 at the front of the vehicle body, a pair of left and right rear wheels 22 at the rear of the vehicle body, and a riding space (cabin) S between the front wheels 21 and the rear wheels 22. The riding space S is surrounded by ROPS 23 and a pair of left and right doors 24. ROPS is an abbreviation for rollover protective structure and is a part of the vehicle body frame 1.

A cargo bed 25 is provided behind the riding space S, and a bonnet 26 is provided in front of the riding space S. Further, at the front end of the cargo bed 25, a back panel 27 that partitions the cargo bed 25 and the riding space S is provided.

In the riding space S, a pair of independent left and right seats 28 is installed. An operation part such as a steering wheel 29 is provided in front of the seat 28.

A power unit 3 is provided below the cargo bed 25. The power unit 3 includes an engine and a transmission. The driving force of the engine is transmitted to the transmission, and the transmission transmits the driving force to the pair of left and right front wheels 21 and the pair of left and right rear wheels 22.

[Structure of Vehicle Body Frame]

Figure 3:
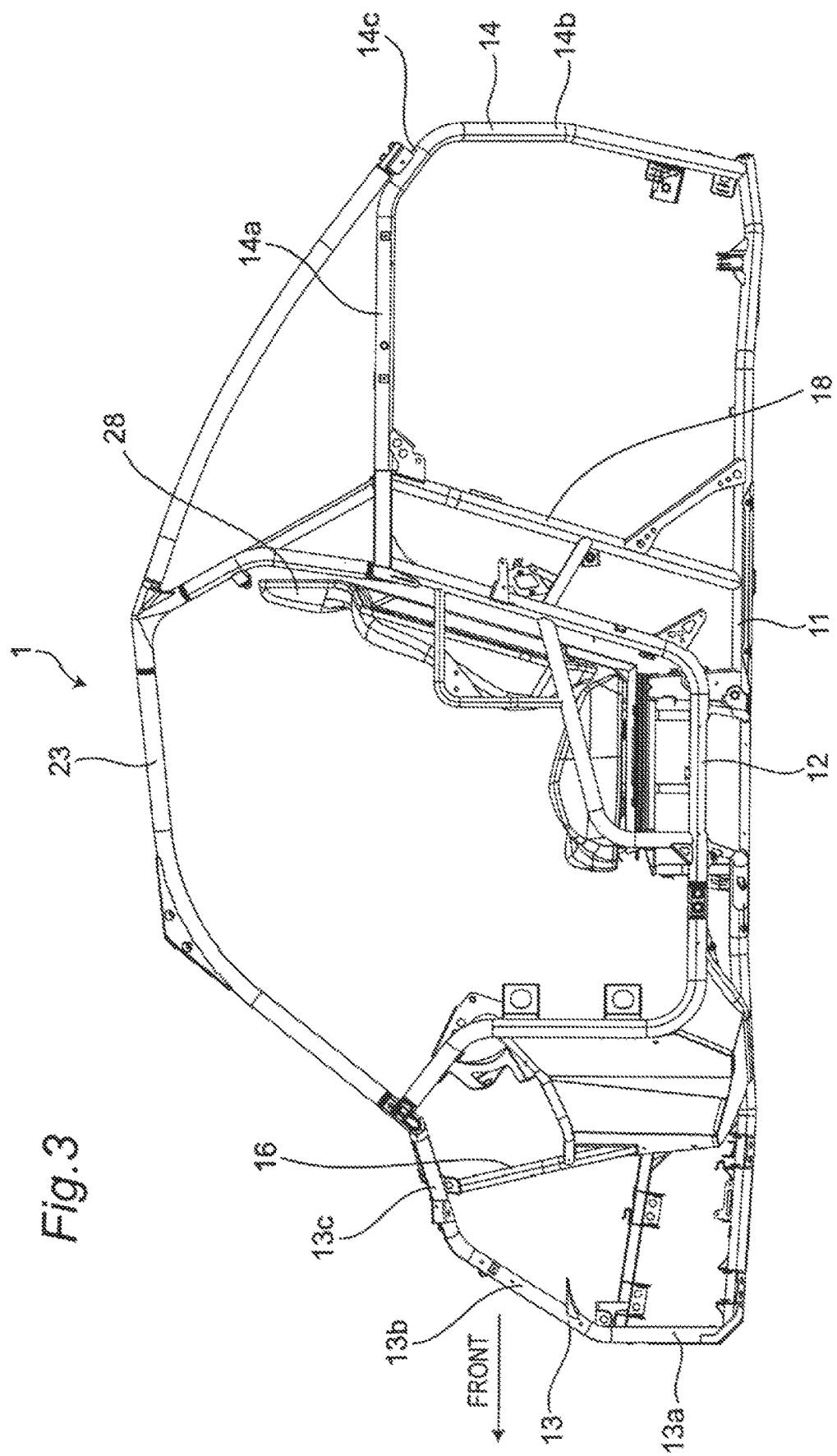
FIG. 3 is a side view of a vehicle body frame shown in FIG. 2.
Figure 4:
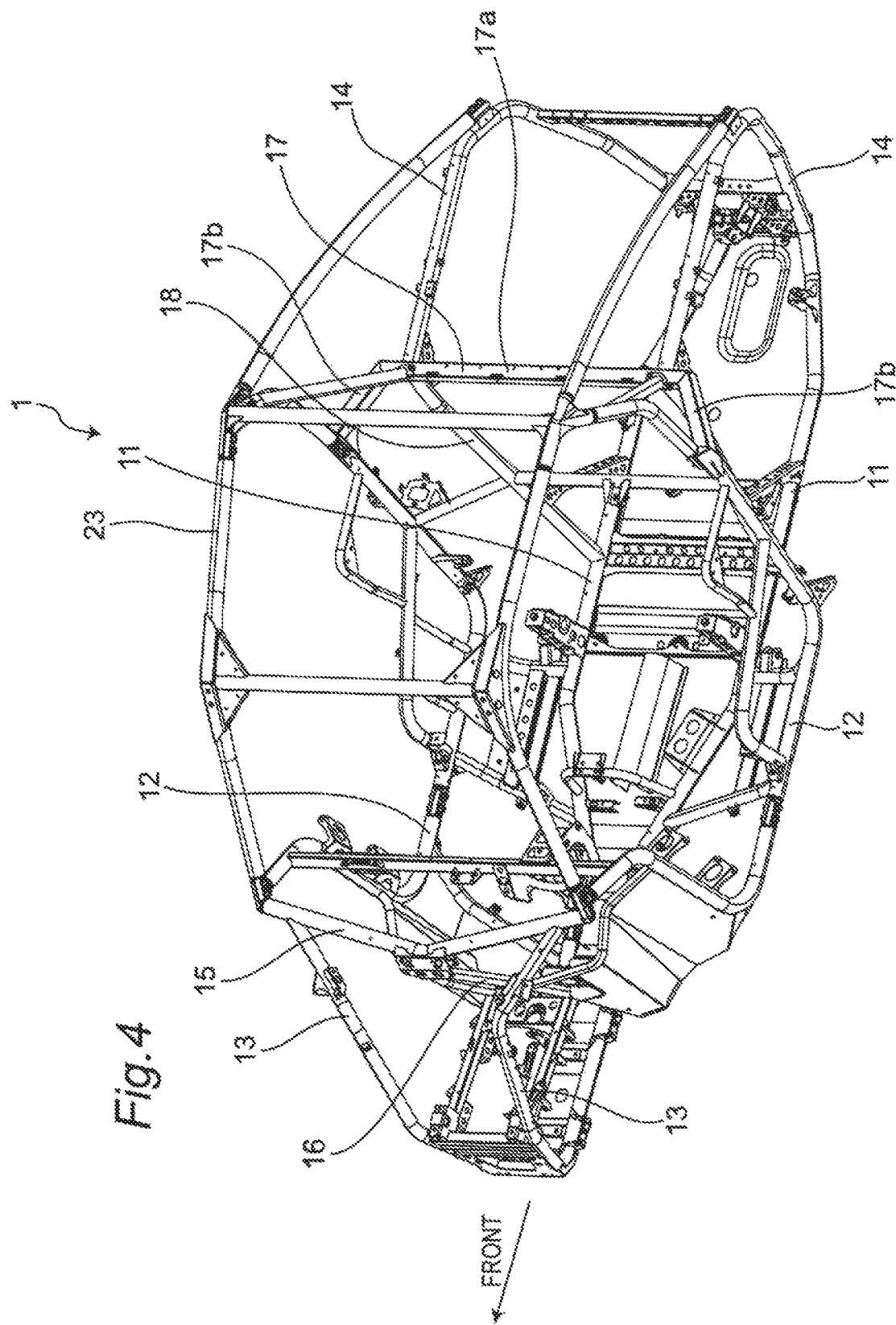
FIG. 4 is a perspective view of a vehicle body frame.

FIG. 3 is a side view of the vehicle body frame 1 shown in FIG. 2, and FIG. 4 is a perspective view of the vehicle body frame 1. As shown in FIGS. 3 and 4, the vehicle body frame 1 includes a pair of left and right main frames 11, a pair of left and right side frames 12, a pair of left and right front frames 13, and a pair of left and right rear frames 14.

The main frames 11 form the framework of the vehicle body frame 1 and extend in the longitudinal direction (front-rear direction) of the vehicle body. On side parts of the main frames 11, the side frames 12 are provided, respectively. On the front upper parts of the main frames 11, the front frames 13 are provided. On the rear upper parts of the main frames 11, the rear frames 14 are provided.

The main frames 11, the side frames 12, the front frames 13, and the rear frames 14 are respectively provided so as to be substantially symmetrical in the lateral direction of the vehicle body (vehicle width direction). At least one cross bar is provided to each of the spaces between the pair of left and right main frames 11, between each of the main frames 11 and each of the side frames 12, between the pair of left and right front frames 13, and between the pair of left and right rear frames 14. By linking respective frames in the vehicle width direction with the cross bars, rigidity in the vehicle width direction of the vehicle body frame 1 is increased.

Each of the side frames 12 is positioned outside, in the vehicle width direction, of each of the main frames 11, and is connected to the main frame 11 by a plurality of cross bars. The side frame 12 extends in the front-rear direction as a whole and has a substantially U shape in a side view.

Each of the front frames 13 has a front vertical frame portion 13a, a central oblique frame portion 13b, and a front oblique frame portion 13c. The front vertical frame portion 13a extends in the vehicle body height direction (vertical direction). The central oblique frame portion 13b extends upward from the upper end of the front vertical frame portion 13a and is inclined rearward. The front oblique frame portion 13c extends upward from the upper end of the central oblique frame portion 13b, and is inclined rearward and outward in the vehicle width direction.

The lower end of the front vertical frame portion 13a is fixed to the front end of the main frame 11 by welding or the like. The upper end of the front oblique frame portion 13c is fixed to a front cross member 15 by welding or the like. The front cross member 15 extends in the vehicle width direction and has a substantially V shape as seen in a front view of the vehicle body. The front cross member 15 is supported by a front support frame 16 erected obliquely forward at the front of the main frame 11.

Each of the rear frames 14 is positioned at the rear of the vehicle body frame 1, extends in the front-rear direction as a whole, and has a substantially L shape as seen in a side view of the vehicle body. The rear frame 14 includes a rear upper frame portion 14a, a rear vertical frame portion 14b, and a rear curved frame portion 14c. The rear upper frame portion 14a extends in the front-rear direction. The rear vertical frame portion 14b extends downward and is inclined inward in the vehicle width direction. The rear curved frame portion 14c is curved so as to connect the rear upper frame portion 14a to the rear vertical frame portion 14b. In the rear frame 14, the lower end of the rear vertical frame portion 14b is fixed to the rear end of the main frame 11 by welding or the like. The front end of the rear upper frame portion 14a is fixed to a rear cross member 17 by welding or the like.

The rear cross member 17 includes a rear lateral bar 17a and left and right rear oblique bars 17b. The rear lateral bar 17a is located at the center of the rear cross member 17, and extends in the vehicle width direction. Each of the rear oblique bars 17b is located on a side of the rear lateral bar 17a, and extends frontward and is inclined outward in the vehicle width direction. The rear lateral bar 17a is supported by a rear support frame 18 extending upward and inclined backward, in an intermediate portion in the front-rear direction of the main frame 11.

[Bottom Structure]

Figure 5:
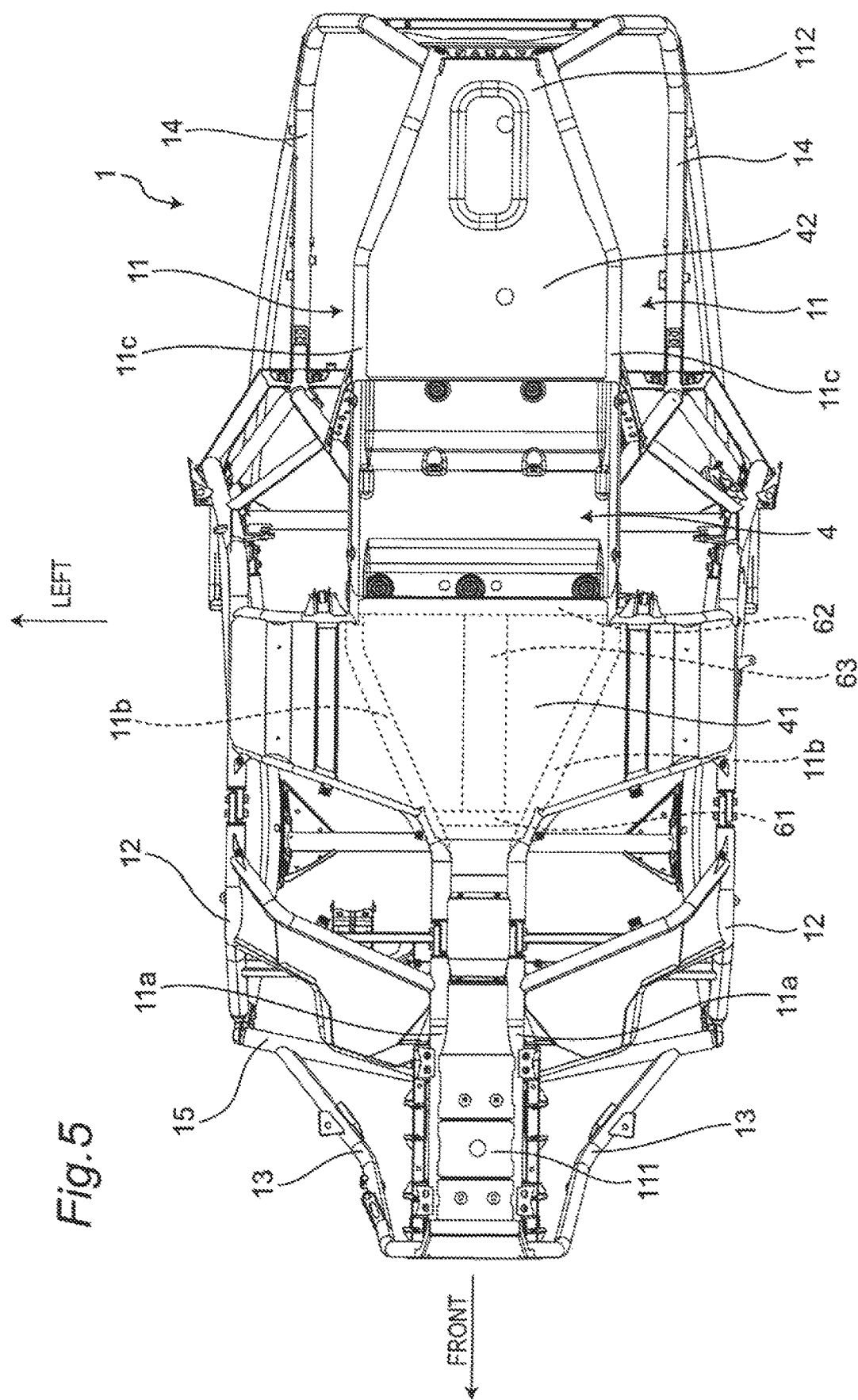
FIG. 5 is a bottom view of the vehicle body frame.
Figure 6:
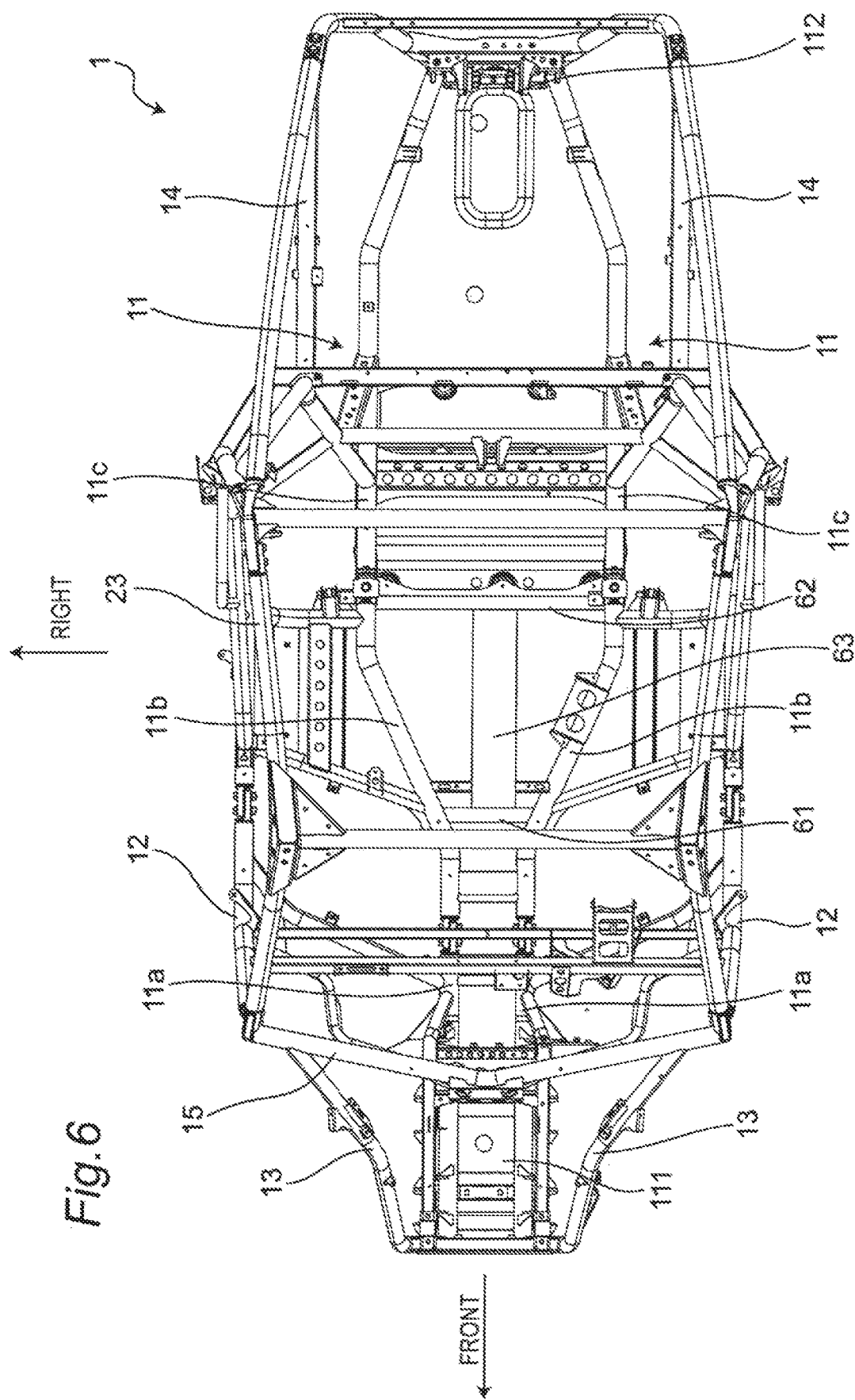
FIG. 6 is a top view of the vehicle body frame.
Figure 7:
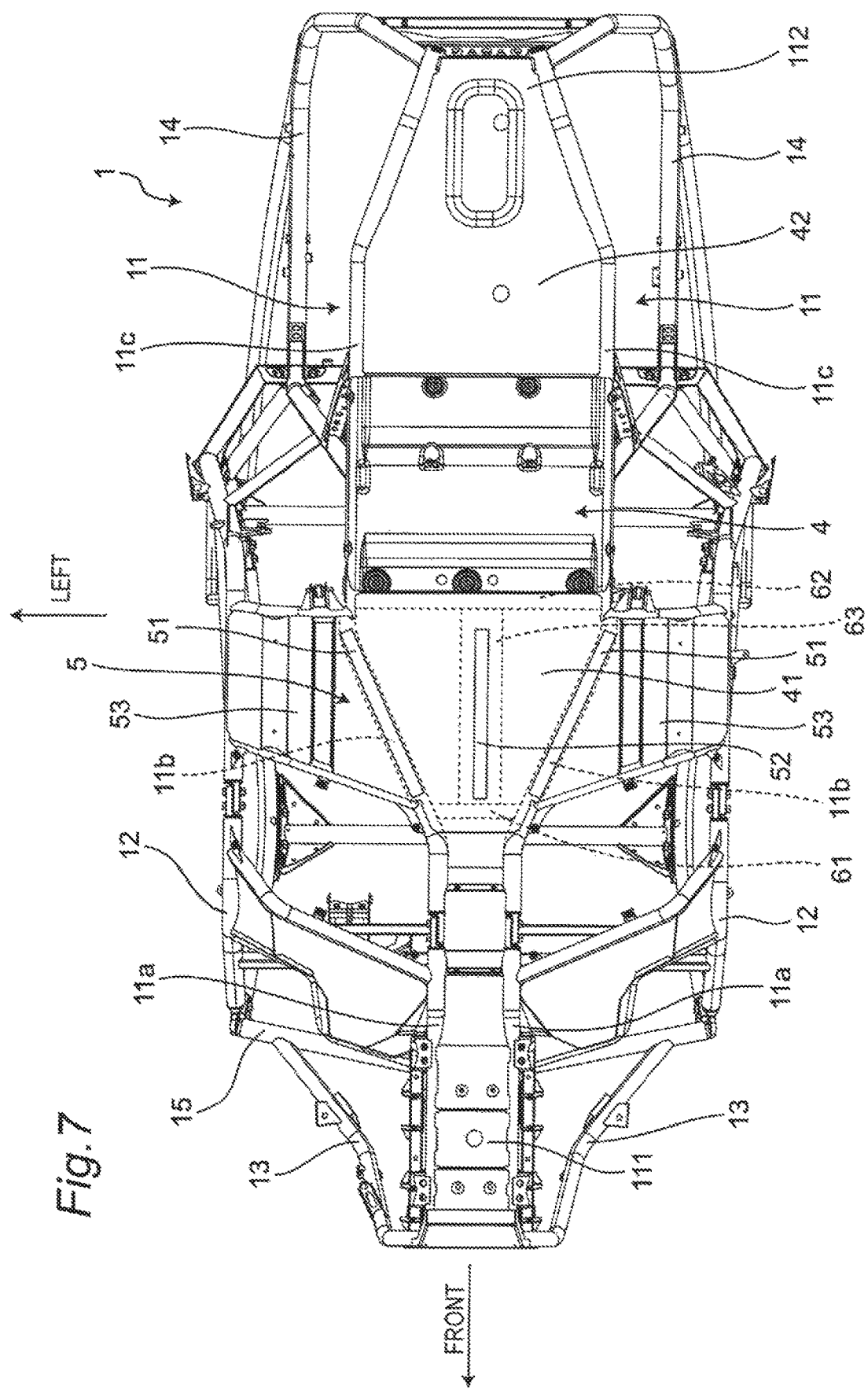
FIG. 7 is a bottom view of the vehicle body frame after a slide member is attached.

FIG. 5 is a bottom view of the vehicle body frame 1, and FIG. 6 is a top view of the vehicle body frame 1. As shown in FIGS. 5 and 6, a bottom plate 4 attached to the main frame 11 is provided below the main frame 11. A slide member 5 is attached to the lower surface of the bottom plate 4. FIG. 7 is a bottom view of the vehicle body frame 1 after the slide member 5 is attached.

The main frames 11 are provided as a left and right pair, and front portions thereof are connected to a front gear support member 111 that supports a front wheel gear box of the utility vehicle 10, and rear portions thereof are connected to a rear gear support member 112 that supports a rear wheel gear box of the utility vehicle 10. The main frames 11 are provided with front frames 11a, center frames 11b, and rear frames 11c that are provided in left and right pairs.

The pair of left and right front frames 11a extends rearward from the front gear support member 111 to the vicinity of the front end of a seat 28 with a constant distance in the vehicle width direction. The pair of left and right center frames 11b is connected to the rear ends of the front frames 11a, and extends rearward from the vicinity of the front end of the seat 28 to the vicinity of the rear end and is inclined outward in the vehicle width direction such that the distance in the vehicle width direction increases, and then extends rearward with a constant distance in the vehicle width direction. The pair of left and right rear frames 11c is connected to the rear ends of the center frames 11b and extends rearward from the vicinity of the rear end of the seat 28 to the vicinity of the transmission of the power unit 3 with a constant distance in the vehicle width direction, and then extends rearward from the vicinity of the transmission of the power unit 3 to the rear gear support member 112 and is inclined inward in the vehicle width direction such that the distance in the vehicle width direction decreases.

The pair of left and right center frames 11b is connected to each other at their front portions by a cross frame 61 extending in the vehicle width direction, and is connected to each other at their rear portions by a cross frame 62 extending in the vehicle width direction. The length in the vehicle width direction of the cross frame 61 is shorter than the length in the vehicle width direction of the cross frame 62. The cross frame 61 and the cross frame 62 are connected to each other by a bracket 63 extending in the front-rear direction. The bracket 63 is located at a center portion in the vehicle width direction of the pair of left and right center frames 11b, and is located at a center portion in the vehicle width direction of the pair of left and right rear frames 11c. Specifically, the bracket 63 connects the center portion in the vehicle width direction of the cross frame 61 and the center portion in the vehicle width direction of the cross frame 62. The length in the front-rear direction (width) of the cross frame 61 and the length in the front-rear direction (width) of the cross frame 62 are the same, and the length in the vehicle width direction (width) of the bracket 63 is larger than the widths of the cross frames 61 and 62.

The bottom plate 4 includes a front bottom plate 41 and a rear bottom plate 42. The front bottom plate 41 is attached to the center frames 11b, and the rear bottom plate 42 is attached to the rear frames 11c. The length in the vehicle width direction of the front bottom plate 41 is almost the same as the distance between the pair of left and right side frames 12 in the top view, and the length in the front-rear direction of the front bottom plate 41 is almost the same as the length in the front-rear direction of the center frames 11b in the top view. Further, the length in the vehicle width direction of the rear bottom plate 42 is almost the same as the distance between the pair of left and right rear frames 11c in the top view, and the length in the front-rear direction of the rear bottom plate 42 is almost the same as the length in the front-rear direction of the rear frames 11c in the top view. The length in the vehicle width direction of the front bottom plate 41 is longer than the length in the vehicle width direction of the rear bottom plate 42, and the length in the front-rear direction of the front bottom plate 41 is shorter than the length in the front-rear direction of the rear bottom plate 42. The front bottom plate 41 mainly supports the load of the seat 28 and the like, and the rear bottom plate 42 mainly supports the load of the power unit 3 and the like.

The slide member 5 is made of plastic, namely high density polyethylene, for example, and includes a pair of left and right main members 51 provided along the center frames 11b. The slide member 5 also includes an intermediate member 52 that is positioned in the middle in the vehicle width direction of the pair of left and right main members 51 and extends rearward in parallel with the front-rear direction of the vehicle body, and outer members 53 that are positioned outside in the vehicle width direction of the pair of left and right main members 51 and extend rearward in parallel with the front-rear direction of the vehicle body. The intermediate member 52 is positioned at the center in the vehicle width direction of the utility vehicle 10, and the pair of left and right main members 51 is arranged so as to be symmetrical with respect to the intermediate member 52. The intermediate member 52 is provided along the bracket 63. Further, the pair of left and right outer members 53 is arranged so as to be symmetrical with respect to the intermediate member 52. The intermediate member 52 and the pair of left and right outer members 53 are parallel to each other.

In the front-rear direction of the vehicle body, the front end position of each of the main members 51 coincides with the front end position of the intermediate member 52, and the rear end position of each of the main members 51 coincides with the rear end position of the intermediate member 52. While the intermediate member 52 extends in parallel with the front-rear direction of the vehicle body, each of the main members 51 extends along each of the center frames 11b, that is, it extends backward and obliquely outward in the vehicle width direction. Therefore, the total length of the main member 51 is longer than the total length of the intermediate member 52. The widthwise length (width) of the main member 51 and the widthwise length (width) of the intermediate member 52 coincide with each other. The width of the main member 51 is shorter than the widthwise length (width) of the center frame 11b, and the main member 51 is hidden behind the center frame 11b in the top view. Further, the width of the intermediate member 52 is shorter than the width of the bracket 63, and the intermediate member 52 is hidden behind the bracket 63 in the top view.

In the front-rear direction of the vehicle body, the front end position of each of the outer members 53 is behind the front end position of the intermediate member 52, and the rear end position of each of the outer members 53 coincides with the rear end position of the intermediate member 52. Each of the outer members 53 and the intermediate member 52 extend in parallel with the front-rear direction of the vehicle body, so that the total length of each of the outer members 53 is shorter than the total length of the intermediate member 52. Therefore, the total length of the outer member 53 is shorter than the total length of the main member 51. The widthwise length of the outer member 53 is longer than the widthwise length of the main member 51 and the widthwise length of the intermediate member 52.

Figure 8:
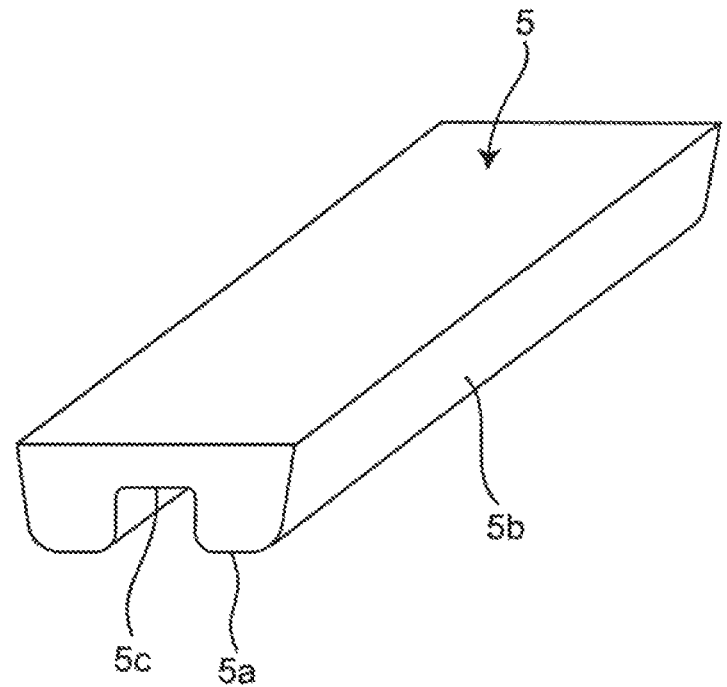
FIG. 8 is a perspective view of the slide member.
Figure 9:
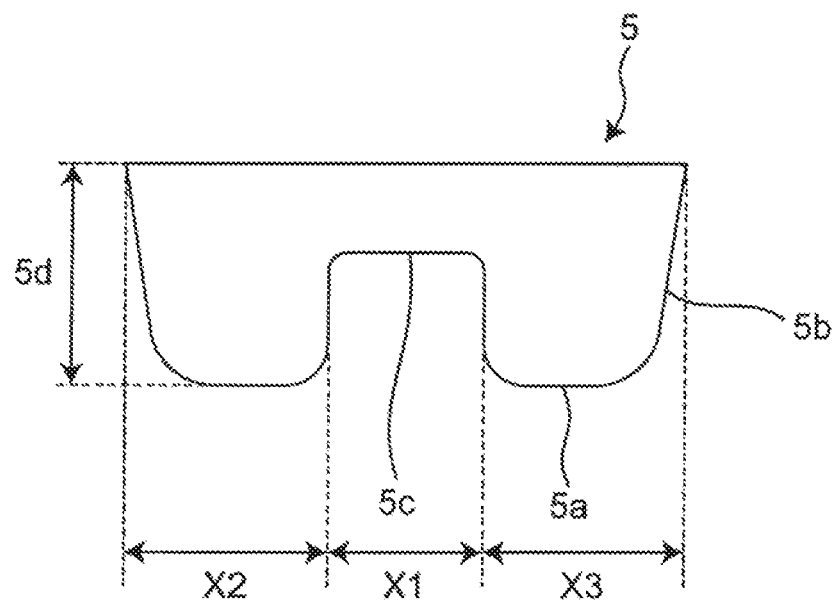
FIG. 9 is a front view of the slide member.

FIG. 8 is a perspective view of the slide member 5, and FIG. 9 is a front view of the slide member 5. As shown in FIGS. 8 and 9, in the slide member 5, the outer ends in the vehicle width direction of the bottom surface 5a are chamfered in all of the main members 51, the intermediate member 52, and the outer members 53. The side surfaces 5b in the vehicle width direction are inclined inward in the vehicle width direction from the upper end to the lower end.

Further, the slide member 5 has a recess 5c that is recessed inward at a center portion in the vehicle width direction on the bottom surface 5a. A vehicle widthwise length X1 of the upper surface of the recess 5c is slightly shorter than vehicle widthwise lengths X2 and X3 of side portions in the vehicle width direction of the recess 5c. The vehicle widthwise length X2 is equal to the vehicle widthwise length X3. Further, the amount of depression of the recess 5c is about a half of the thickness 5d in the vertical direction of the slide member 5.

According to the utility vehicle 10 configured as described above, the following effects can be exhibited.

(1) Since the slide member 5 is attached to the lower surface of the bottom plate 4, even when an obstacle is in contact with the bottom plate 4, the vehicle can easily run over the obstacle by the slide member 5, and the traveling performance on an uneven ground can be further enhanced.

(2) Since the main members 51 of the slide member 5 are provided along the center frames 11b, the slide member 5 can be firmly supported. In addition, since the main members 51 extend rearward and obliquely outward in the vehicle width direction along the center frames 11b, even when an obstacle is in contact with the main member 51, the obstacle can be easily released outward in the vehicle width direction along the traveling of the utility vehicle 10. This can suppress catching of the obstacle.

(3) Since the intermediate member 52 of the slide member 5, positioned in the middle in the vehicle width direction of the pair of left and right main members 51 and extending rearward in parallel with the front-rear direction of the vehicle body, is provided, it is possible to suppress catching of the obstacle in the center portion in the vehicle width direction. Further, since the intermediate member 52 is provided along the bracket 63, the intermediate member 52 can be firmly supported.

(4) Since the lengths in the front-rear direction of the vehicle body and the widthwise lengths of the main members 51 and the intermediate member 52 coincide with each other, it is possible to suppress catching of an obstacle between each of the main members 51 and the intermediate member 52.

(5) By providing the outer members 53 of the slide member 5, it is possible to suppress catching of an obstacle in the vicinity of the end portion in the vehicle width direction.

(6) Outer ends in the vehicle width direction of the bottom surfaces of the main members 51, the intermediate member 52 and the outer members 53 of the slide member 5 are chamfered, and the outer surfaces in the vehicle width direction are inclined inward in the vehicle width direction from the upper end toward the lower end. Therefore, even when an obstacle is in contact with the slide member 5, the obstacle can be easily released.

(7) The chamfered portions of the main members 51 of the slide member 5 extend in parallel with the direction in which the center frames 11b extend. Therefore, compared with the case where the chamfered portions extend in parallel with the front-rear direction of the vehicle body, the productivity of the slide member 5 can be improved. In addition, an obstacle can be more easily released outward in the vehicle width direction.

(8) Since the amount of depression of the recess 5c is about a half of the thickness in the vertical direction of the slide member 5, the surface area of the bottom surface 5a can be increased while suppressing catching of an obstacle in the recess 5c. As a result, the contact area between the slide member 5 and an obstacle can be increased, whereby the sliding performance of the slide member 5 can be improved.

In the embodiment, the slide member 5 includes the main members 51, the intermediate member 52, and the outer members 53. However, the slide member 5 may include the main members 51 and the intermediate member 52, and may not include the outer members 53, or may include only the main members 51. Further, in the embodiment, while the main members 51 are provided along the center frames 11b, the main members may extend rearward in parallel with the front-rear direction of the vehicle body and the main members and the intermediate member may extend in parallel with each other.

In the embodiment, the slide member 5 is attached to the front bottom plate 41 of the bottom plate 4, but may be attached to the rear bottom plate 42 as well. When the slide member 5 is attached to the rear bottom plate 42, it is preferable that the main members of the slide member 5 are provided along the rear frames 11e supporting the rear bottom plate 42. Furthermore, as the slide member 5, it is preferable to provide an intermediate member that is positioned in the middle in the vehicle width direction of the main members and extends rearward in parallel with the front-rear direction of the vehicle body. In the utility vehicle 10, the front bottom plate 41 is usually configured to be positioned lower than the rear bottom plate 42. In that case, the slide member 5 is attached to the front bottom plate 41 preferentially. If the rear bottom plate 42 is positioned lower than the front bottom plate 41, the slide member is attached to the rear bottom plate preferentially. In any case, the slide member 5 is attached preferentially to the lowermost one of the bottom plates 4.

Various modifications and alterations can be made without departing from the spirit and scope of the present invention described in the claims.

What is claimed is:

1. A utility vehicle comprising:
   a main frame;
   a bottom plate below the main frame and attached to the main frame; and
   a slide member attached to a lower surface of the bottom plate;
   wherein the main frame includes a pair of left and right center frames extending obliquely outward in a vehicle width direction from a vicinity of a front end of a seat of the utility vehicle toward a vicinity of a rear end of the seat, and
   wherein the slide member includes:
      a pair of left and right main members extending obliquely outward in a vehicle width direction from a vicinity of a front end of a seat of the utility vehicle toward a vicinity of a rear end of the seat, and
      a pair of outer members positioned outwardly of the pair of left and right main members with respect to the vehicle width direction, the pair of outer members extending rearward in parallel with a longitudinal axis of a vehicle body of the utility vehicle.

2. The utility vehicle of claim 1, wherein the slide member is made of plastic.

3. The utility vehicle of claim 1, wherein each of the pair of left and right main members and each of the pair of outer members has:
   chamfered bottom outer edges with respect to the vehicle width direction, the chamfered bottom outer edges extending in parallel to a longitudinal axis of a corresponding one of the pair of left and right center frames, and
   inclined outer surfaces with respect to the vehicle width direction, the outer surfaces being inclined inwardly from an upper surface to a lower surface.

4. The utility vehicle of claim 1, wherein each of the pair of left and right main members and each of the pair of outer members has a recess extending along a longitudinal axis thereof, the recess having a width in a direction orthogonal to the longitudinal axis.

5. The utility vehicle of claim 4, wherein the recess is located at a center with respect to a width of each respective one of the pair of left and right main members and the pair of outer members, and a width of the recess is less than a width of each of side portions of the recess extending along the recess.

6. The utility vehicle of claim 1, wherein each of the pair of left and right main members and each of the pair of outer members has a uniform cross-sectional shape along a longitudinal axis thereof.

7. The utility vehicle of claim 1, wherein the slide member is located between outer edges of a vehicle body of the utility vehicle.

8. The utility vehicle of claim 7, wherein the main frame is located between the outer edges of the vehicle body, and the slide member is located below and along the main frame.

9. The utility vehicle of claim 1, wherein the pair of left and right main members extend along the pair of left and right center frames on opposite sides of the bottom plate.

10. The utility vehicle of claim 1, wherein the slide member is positioned in the middle in a vehicle width direction of the pair of left and right main members, and the slide member includes an intermediate member extending rearward in parallel with a front-rear direction of the vehicle body.

11. The utility vehicle of claim 10, wherein a front end position of each of the main members and a front end position of the intermediate member are aligned with respect to the front-rear direction of the vehicle body, and a rear end position of each of the main members and a rear end position of the intermediate member are aligned with respect to the front-rear direction of the vehicle body, and a width of each of the main members and a width of the intermediate member are equal.

12. The utility vehicle of claim 7, wherein the slide member has an outer edge and an outer surface with respect to the vehicle width direction, a bottom surface of the outer edge being chamfered, and the outer surface being inclined inwardly with respect to the vehicle width direction from an upper surface toward the bottom surface.

\* \* \* \* \*